United States Patent [19]

Froschauer et al.

[11] 4,256,686

[45] Mar. 17, 1981

[54] METHOD AND DEVICE FOR THE PRODUCTION OF AN OXIDE CERAMIC TUBE

[75] Inventors: Leonhard E. Froschauer; Rudolf U. B. Knape; Dieter, H. Schmidt, all of Aschau, Fed. Rep. of Germany

[73] Assignee: W. Haldenwanger KG, Waldkraiburg, Fed. Rep. of Germany

[21] Appl. No.: 889,105

[22] Filed: Mar. 22, 1978

[30] Foreign Application Priority Data

Apr. 6, 1977 [DE] Fed. Rep. of Germany ....... 2715852

[51] Int. Cl.3 .............................................. B29D 23/04

[52] U.S. Cl. ...................................... 264/209; 425/380

[58] Field of Search ................. 264/209; 425/380, 381

[56] References Cited

U.S. PATENT DOCUMENTS 3,879,507 4/1975 Cavanna et al. ..................... 264/209

*Primary Examiner*—John Parrish

*Attorney, Agent, or Firm*—Basile, Weintraub & Hanlon

[57] ABSTRACT

A device and a method for producing a closed end tube with the tube wall and the end being thereof one continuous piece. The tube is made in a repeatable process in such a way that the tube possesses uniform strength in all areas.

1 Claim, 1 Drawing Figure

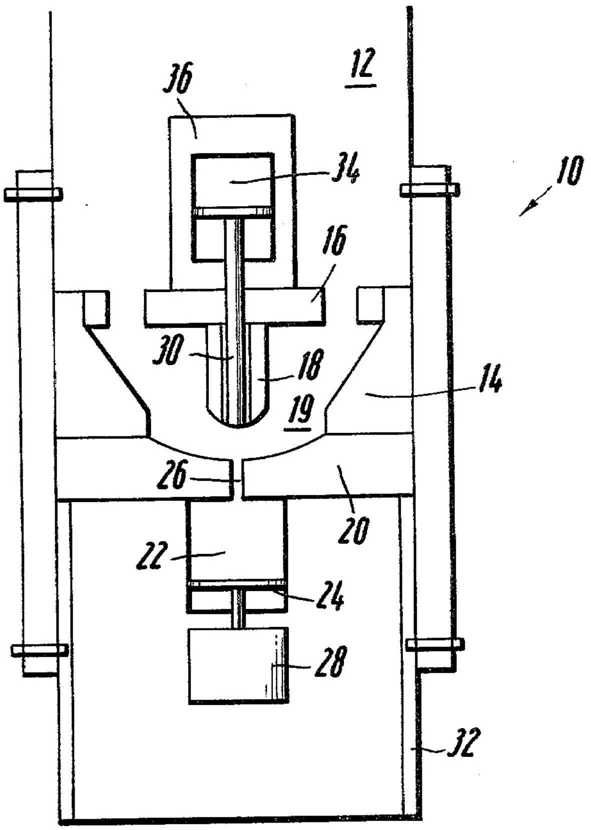
36
12
34
10
16
30
18
14
19
26
20
22
24
28
32

METHOD AND DEVICE FOR THE PRODUCTION OF AN OXIDE CERAMIC TUBE

BACKGROUND OF THE INVENTION

I. Field of the Invention

The present invention is concerned with a process for the production of an oxide ceramic tube which is closed on one end with a top. The tube is made by the extrusion of a plasticized oxide ceramic material through a die and over a spike and then the closing of one end of the tube with a hemisphere-shaped top which is made from the tube material. The invention concerns a device with a die at the end of the extruder and with a spike which is located in the center of the die.

II. Description of the Prior Art

Employing a method which was known before, the extruded tube, which was not baked and open at the end, was closed at one end with a tube top which was separately made from the tube material and die cast. The tube which was closed on one end in the aforementioned way was then baked. In the case of these tubes which were produced according to this method, it was found that the connection between the end of the tube and the top showed a lower strength than the tube itself after the baking process. A separation of the top could occur if the tube were exposed to a higher than normal strain. Attempts have also been made to increase the strength of the connection between the end of the tube and the top by having them made separately and welding them together using an electric arc or a high-temperature oven. After the baking process, however, even this improved method did not show satisfactory results since, even in this case, the top which was welded to the tube did not result in the same strength at the joint as compared with the basic material.

In another improved method it has been attempted to produce the tube with a top at the end in one piece at the beginning of the extrusion process; however, the extrusion process of the entire tube could only be performed in that case when a hole would remain in the top at the end of the tube, through which hole the venting of the inner area of the tube during the tube extrusion was possible. Before the baking of the tube which was produced in such a fashion, the venting hole which remained in the top had to be closed with the unbaked ceramic material by hand. In carrying out the above process, it could be shown that this closing of the venting hole in the top by hand made it possible that the top, which had already its finished form, was distorted in such a way that it would not show the desired wall thickness or shape. In addition, the closing of the venting hole in the top would not insure that the material which was introduced into the venting opening would form a complete bond with the material of the rest of the top. Therefore, even in case of the tubes which were produced according to the latter method, it was found that areas with lower material strength occurred in the general area of the top after the baking process. In the known device which was used to perform the latter method, difficulties were experienced concerning the production of the top at the end of the tube which was equipped with a venting hole during the first stage of the extruding process. Due to insufficient venting, it often was difficult to withdraw the central spike from the mold. The central spike in the present invention is necessary for the formation of the venting hole after the edge of the top has been formed. In many cases a part of the formed top is damaged when the central spike is removed. This made it necessary to close a larger area of the preshaped top by hand than it would have been actually necessary for the venting of the inside of the tube during the subsequent extrusion process. This was also a reason why tube tops resulted which exhibited, in many cases, insufficient strength.

SUMMARY OF THE INVENTION

It is the objective of the invention to improve the known method and the device for the production of an oxide ceramic tube which has been closed at one end in such a way that the tube shows uniform strength in the area of the closed end of the tube and in the rest of the tube. This problem concerning the method of production is solved in accordance with the invention as described in the claims.

It is the purpose of this invention to disclose a device and a method for producing a closed end tube with the wall of the tube and the end being one continuous piece with uniform wall thickness. The tube is made in a repeatable process under controlled conditions in such a way that the tube possesses a uniform strength in all areas.

A venting tube is used which insures that air is removed from the inside of the mold during the extrusion process in such a way that the formation of cavities within the area of the end is avoided. In this way a uniform density of the material in the area of the end is insured. The small loss of material due to the filling of the cavity in the tool used for the shaping of the top is not of significance in comparison to the insurance that has been gained that the top consists of uniformly compressed material.

The introduction of the venting gas, such as air, through the inside of the spike into the inside of the tube after the formation of the hemisphere-shaped end of the tube does not hinder the uniform extrusion process, but rather enhances it. The addition of the venting gas, preferably air from the outside, into the inside of the extruded tube which is closed at the end can be controlled in such a way with the extrusion process that neither a pressure lower than atmospheric pressure nor a pressure higher than atmospheric pressure is created in the inside of the tube during the extrusion process.

The minor projection which is created at the outside center of the finished tube end by the venting hole in the tool used to make the top does not have any detrimental influence on the strength of the end of the tube. This projection can readily be removed before or after the baking of the tube. Using the device according to the invention, the formation of the tube end and the subsequent extrusion of the tube which is closed at the end can be carried out continuously, one after the other.

After the formation of the tube end, space is provided for the extrusion of the tube by removal of the tool which was used to make the end by moving it to the side using a swinging motion. The narrow projection of material which was formed by entry of material into the vent hold during the forming of the end can readily be removed during the removal of the tool which was used to make the end without damage. After the removal of the tool which was used to make the top, the extrusion of the tube which is closed at the end can be carried out in an unhindered fashion by means of a controlled addition of the venting gas through the spike.

Another embodiment of the device according to the invention consists of connecting the tool which is used to make the top with a first hydraulic cylinder and connecting the membrane which closes the space with a second hydraulic cylinder and connecting, furthermore, the needle in the spike with a third hydraulic cylinder.

Other objects, advantages and applications of the present invention will become apparent to those skilled in the art of ceramic tubes when the accompanying description of several examples of the best modes contemplated for practicing the invention is read in conjunction with the accompanying drawing.

BRIEF DESCRIPTION OF THE DRAWING

The description herein makes reference to the accompanying drawing wherein like reference numerals refer to like parts thoughout the drawing, and wherein the FIGURE as shown is an example of the invention constructed in accordance with the principles disclosed herein. The FIGURE shown is the sole and only figure in this application, which FIGURE shows schematically an extruder for the production of an oxide ceramic tube which has a closed end formed from one piece of ceramic.

DESCRIPTION OF THE PREFERRED EMBODIMENTS

The device for the production of an oxide ceramic tube which is closed at one end is designated, in general, as 10. It consists of a die 14 below a screen 16 at the end of an extruder. Within the space of the die there is located a fixed spike 18 which is connected to the screen. At the end of the die a tool 20 to make the top is shown by means of which the lower end of the die 14 can be closed. When the die is closed, an inner space of the mold 19 is formed by the tool used to make the top 20 and by the die 14. The spike 18 protrudes into the inner space of the mold 19. The oxide ceramic material, which was extruded by the extruder, is pushed through the screen 16 into this inner space of the mold 19.

The tool 20 used to make the top possesses a space 22 below the inner space of the mold 19. This space 22 is connected with the inner space of the mold 19 by means of a venting hole 26. Within the space 22 a membrane is located in the shape of a rubber gasket 24 which is connected with a second hydraulic cylinder 28. By means of this hydraulic cylinder 28, the rubber gasket 24 can be moved within the space 22 in such a way that the volume of the space 22 can be increased or decreased, respectively. The tool 20 used to make the top as such is connected by means of a connection 32 with a first hydraulic cylinder, which is not shown, by means of which the tool 20 used to make the top can be removed from the die.

A needle 30 is located within the spike 18, which needle 30 extends within the spike 18 through a venting hole to the lower end of the spike which is, in this way, smoothly closed. The needle 30 and the venting hole in the spike 18 are dimensioned in such a way that the venting hole is completely closed when the needle is inserted. The needle 30 is connected above the spike with a third hydraulic cylinder 34 by means of which the needle 30 can be retracted from the venting hole of the spike 18 so that a venting gas can be passed through a connection, which is not shown, and through the venting hole within the spike 18 into the inner space of the mold 19. The third hydraulic cylinder 34 is located between the screen 16 and the end of the extruder 12. The third hydraulic cylinder 34 is tightly closed with a protective cover 36 to protect it from the extruded material which emanates from the extruder.

For the production of an oxide ceramic cylindrical tube, which tube also could exhibit a cross section of any shape respectively and which tube is closed at one end by a top, the tool for making this top 20 is lifted by the first hydraulic cylinder, which is not shown, and pushed against the lower end of the die 14. Simultaneously, the second hydraulic cylinder 28 within the tool for making the top 20 is operated in such a way that the membrane 24 is moved into the space 22, and the space 22 is reduced to a minimum volume. The needle 30 within the spike is moved downward by means of the third hydraulic cylinder 34 in such a way that the venting hole in the spike 18 is completely closed and the spike possesses a smooth area at its lower end, which area corresponds in its shape to the tube top which is to be produced. At this point the inner space of the mold 19 within the die is completely closed. For the sake of completeness, it should also be mentioned that the tool for the production of the top possesses at the inner area of the mold the same shape which is desired for the outer area of the tube top. At this point the extrusion of the oxide ceramic material is carried out by the extruder, and the plasticized oxide ceramic material enters the inner space of the mold 19 via the screen 16. For the purpose of venting of the inner space of the mold 19, the second hydraulic cylinder 28 is operated in such a way that the membrane 24 increases the space 22 progressively. In this way the air which is contained in the inner space of the mold 19 and which air is compressed by means of the extruded material which enters through the screen 16 can enter the space 22 through the venting hole. The die 14 is closed by means of the tool for the production of the top 20 and the extruding process, which is controlled by a timer, is continued for such a period of time until it is sure that all of the air from the inner space of the mold 19 has been passed through the venting hole 26 into the space 22. This period of time is also sufficiently long that together with the remaining air from the inner space of the mold 19 extruded material enters the space 22 through the venting hole 26. In this way it is insured that air is not entrapped in the area of the top at the end of the extruded tube, but rather that this area of the top consists of extruded material of a homogeneous nature.

After the first step of the method has been completed, the tool for the production of the top is moved away from the end of the die 14 by means of a first hydraulic cylinder, which is not shown. In this way the stem of material contained in venting hole 26 is cut off. After the tool for the production of the top 20 has been moved away from the opening area of the die 14, the needle 30 is retracted from the venting hole in the spike 18 by operation of the third hydraulic cylinder 34. Now the tube is further extruded through the die 14 and around the spike 18. Since the opened venting hole within the spike 18 is connected with a source of gas, the necessary amount of gas with the necessary pressure can be introduced through this venting hole and through the spike 18 into the inside of the tube which is being formed in such a way that the creation of a vacuum at the lower end of the spike 18 during extrusion of the tube through the die 14 and around the spike 18 is avoided. Depending on the viscosity of the oxide ceramic material which is being used in the extruder, a desired pressure higher than atmospheric pressure can be maintained in the inside of the tube by means of the gas source and through the venting hole in the inside of the spike. Concurrent with the production of the tube, the tool for the production of the top is again prepared by cleaning the space 22 and the venting hole 26, into which spaces oxide ceramic material had entered, and by operation of the second hydraulic cylinder 28 which moves the rubber gasket 24 again into a position where the space 22 shows a minimum volume. After the extrusion process has been completed and after the completed tube has been removed from the end of the die, the third hydraulic cylinder 34 is operated for the production of a new tube such that the needle 30 again closes again the venting hole in the spike 18. With the closing of the die end by the tool for the production of the top 20, the process for the production of an oxide ceramic tube which is closed at one end starts again. It is obvious to one skilled in the art that pneumatic cylinders can, of course, be used advantageously instead of the hydraulically operated cylinders.

What is claimed is as follows:

1. A method for the production of an oxide ceramic tube which is completely closed at one end by a continuous process comprising the steps of:

extruding plasticized oxide ceramic material through a screen and over a spike;

closing a die having a hemisphere shape for forming the end;

increasing a space associated with the die as the extrusion process continues which space is connected with the die cavity by means of a first venting hole;

after complete formation of the closed end, moving the die downward and sideways to clear the tube;

opening a second venting hole in the spike by retraction of a needle for the admission of air into the inside of the tube; and continuing extrusion of the tube to a desired length with the admission of air to the inside of the tube to prevent collapse of the tube.

* * * * *